US012192111B1

(12) United States Patent
McClure

(10) Patent No.: US 12,192,111 B1
(45) Date of Patent: Jan. 7, 2025

(54) NOTIFICATION OF DISCARDED PDCP SDUS IN A WIRELESS NETWORK APPARATUS

(71) Applicant: AerKodo, LLC, Midlothian, TX (US)

(72) Inventor: Kenneth McClure, Midlothian, TX (US)

(73) Assignee: AerKodo, LLC, Midlothian, TX (US)

( * ) Notice: Subject to any disclaimer, the term of this patent is extended or adjusted under 35 U.S.C. 154(b) by 0 days.

(21) Appl. No.: 18/805,503

(22) Filed: Aug. 14, 2024

Related U.S. Application Data

(60) Provisional application No. 63/665,684, filed on Jun. 28, 2024.

(51) Int. Cl.
*H04L 47/32* (2022.01)
*H04L 47/28* (2022.01)
(52) U.S. Cl.
CPC .............. *H04L 47/32* (2013.01); *H04L 47/28* (2013.01)

(58) Field of Classification Search
None
See application file for complete search history.

(56) References Cited

U.S. PATENT DOCUMENTS

2009/0103478 A1* 4/2009 Sammour ............... H04L 69/28
370/328
2023/0224383 A1* 7/2023 Wang ................... H04L 69/321
709/224

OTHER PUBLICATIONS

3GPP TS 38.323 V18.1.0 (Mar. 2024).
R2-2404102; Report of 3GPP TSG RAN WG2 meeting #125bis, Changsha, China (May 10, 2024).

* cited by examiner

*Primary Examiner* — Anh Ngoc M Nguyen

(57) ABSTRACT

A method comprising receiving, by a Packet Data Convergence Protocol (PDCP) entity, a plurality of PDCP SDUs for transmission, discarding at least one PDCP SDU from the plurality of PDCP SDUs for transmission, and transmitting a discard notification, the discard notification indicating the discarding of the PDCP SDU is disclosed.

19 Claims, 3 Drawing Sheets

NOTIFICATION OF DISCARDED PDCP SDUS IN A WIRELESS NETWORK APPARATUS

CROSS-REFERENCE TO RELATED APPLICATIONS

The present application claims the benefit of U.S. Provisional Application No. 63/665,684, filed on Jun. 28, 2024, which is incorporated by reference in its entirety.

TECHNICAL FIELD

The present application relates generally to the discarding of PDCP SDUs and providing a discard notification in a wireless network apparatus.

BACKGROUND

As wireless devices transmit and receive greater amounts of data, it becomes increasingly important for the communication of data to become more efficient. In the PDCP layer, it has become important to discard PDCP SDUs in certain circumstances. However, discarding PDCP SDUs at the transmitting PDCP entity may result in operational inefficiencies in the receiving PDCP entity. Therefore, it is desirable to facilitate efficiency for the receiving PDCP entity when the PDCP SDUs are discarded at the transmitting PDCP entity.

SUMMARY

Various aspects of examples of the invention are set out in the claims.

One or more embodiments may provide an apparatus, a computer readable medium, a non-transitory computer readable medium, a computer program product, and/or a method for receiving, by a Packet Data Convergence Protocol (PDCP) entity, a plurality of PDCP SDUs for transmission, discarding at least one PDCP SDU from the plurality of PDCP SDUs for transmission, and transmitting a discard notification, the discard notification indicating the discarding of the PDCP SDU.

One or more embodiments may provide an apparatus, a computer readable medium, a computer program product, and/or a non-transitory computer readable medium having means for receiving, by a Packet Data Convergence Protocol (PDCP) entity, a plurality of PDCP SDUs for transmission, discarding at least one PDCP SDU from the plurality of PDCP SDUs for transmission, and transmitting a discard notification, the discard notification indicating the discarding of the PDCP SDU.

In at least one example embodiment, the PDCP entity is comprised by a user equipment.

In at least one example embodiment, the PDCP entity is comprised by a base station.

One or more example embodiments further perform receiving configuration information indicating that the discard notification is enabled.

In at least one example embodiment, the configuration information indicates that a discard notification comprising a bitmap indication is enabled.

In at least one example embodiment, the configuration information indicates that a discard notification comprising a range indication is enabled.

In at least one example embodiment, the discard notification is a PDCP control PDU.

One or more example embodiments further perform generating of the discard notification.

In at least one example embodiment, the discard notification is generated based on the discarding of the at least one PDCP SDU.

In at least one example embodiment, the discard notification indicates the discarding of the PDCP SDU by way of a bitmap indication.

In at least one example embodiment, the discard notification comprises the bitmap indication and a first discarded PDCP SDU indication.

In at least one example embodiment, the first discarded PDCP SDU indication is a count.

In at least one example embodiment, the first discarded PDCP SDU indication is a sequence number (SN).

In at least one example embodiment, each bit position of the bitmap indication corresponds with a PDCP SDU that follows a PDCP SDU indicated by the first discarded PDCP SDU indication.

In at least one example embodiment, a first bit in the bitmap corresponds with a PDCP SDU immediately subsequent to the PDCP SDU indicated by the first discarded PDCP SDU indication.

In at least one example embodiment, an nth bit in the bitmap corresponds with a PDCP SDU that is n PDCP SDUs after the PDCP SDU indicated by the first discarded PDCP SDU indication.

In at least one example embodiment, each bit value in the bitmap indication indicates whether or not the corresponding PDCP SDU was discarded.

In at least one example embodiment, each bit value in the bitmap indicates whether the corresponding PDCP SDU was either discarded or sent to lower layers by the PDCP entity for transmission.

One or more example embodiments further perform generating the bitmap indication.

In at least one example embodiment, generating the bitmap indication comprises determining a size of the bitmap indication.

In at least one example embodiment, the size of the bitmap indication is an integer multiple of 8.

In at least one example embodiment, the size of the bitmap indication is determined such that the bitmap comprises a bit corresponding to a last discarded PDCP SDU.

In at least one example embodiment, the discard notification comprises a range indication and the size of the bitmap indication is determined such that the last bit of the bitmap corresponds with a PDCP SDU immediately prior to a PDCP SDU that is indicated by the range indication.

In at least one example embodiment, the discard notification indicates the discarding of the PDCP SDU by way of a range indication.

In at least one example embodiment, the range indication comprises a first discarded PDCP SDU indication.

In at least one example embodiment, the first discarded PDCP SDU indication is a count.

In at least one example embodiment, the first discarded PDCP SDU indication is an SN.

In at least one example embodiment, the range indication comprises a last discarded PDCP SDU indication.

In at least one example embodiment, the last discarded PDCP SDU indication indicates the last discarded PDCP SDU included by the range indication.

In at least one example embodiment, the last discarded PDCP SDU indication directly indicates the last discarded PDCP SDU included by the range indication.

In at least one example embodiment, the last discarded PDCP SDU indication is a count.

In at least one example embodiment, the last discarded PDCP SDU indication is an SN.

In at least one example embodiment, the last discarded PDCP SDU indication indirectly indicates the PDCP SDU.

In at least one example embodiment, the last discarded PDCP SDU indication indicates an offset from the first discarded PDCP SDU.

One or more example embodiments further perform generating the range notification.

In at least one example embodiment, discarding at least one PDCP SDU comprises discarding a plurality of PDCP SDUs.

In at least one example embodiment, the discarded plurality of PDCP SDUs is contiguous.

In at least one example embodiment, the discard notification comprises a range indication.

One or more example embodiments further perform determining that the discarded plurality of PDCP SDUs is sufficiently contiguous.

One or more example embodiments further perform determining to include the range indication in the discard notification based on the determination that the discarded plurality of PDCP SDUs is sufficiently contiguous.

In at least one example embodiment, a number of contiguous discarded PDCP SDUs exceeds a range threshold.

One or more example embodiments further perform determining that the number of contiguous discarded PDCP SDUs exceeds the range threshold.

In at least one example embodiment, determining to include the range indication in the discard notification is based on the determination that the number of contiguous discarded PDCP SDUs exceeds the range threshold.

In at least one example embodiment, the discarded plurality of PDCP SDUs is non-contiguous.

In at least one example embodiment, the discard notification comprises a bitmap indication and a corresponding first discarded PDCP SDU indication.

In at least one example embodiment, the discarded plurality of PDCP SDUs is sufficiently non-contiguous.

In at least one example embodiment, the discard notification comprises a bitmap indication and a corresponding first discarded PDCP SDU indication.

One or more example embodiments further perform determining to include the bitmap indication and the corresponding first discarded PDCP SDU indication in the discard notification based on the discarded plurality of PDCP SDUs being sufficiently non-contiguous.

One or more example embodiments further perform determining that the discarded plurality of PDCP SDUs is sufficiently non-contiguous.

One or more example embodiments further perform determining to include the bitmap indication and the corresponding first discarded PDCP SDU indication in the discard notification based on the determination that the discarded plurality of PDCP SDUs is sufficiently non-contiguous.

In at least one example embodiment, a number of contiguous discarded PDCP SDUs does not exceed a range threshold.

One or more example embodiments further perform determining that the number of contiguous discarded PDCP SDUs does not exceed the range threshold.

One or more example embodiments further perform determining to include the bitmap indication and the corresponding first discarded PDCP SDU indication in the discard notification based on the determination that the number of contiguous discarded PDCP SDUs does not exceed the range threshold.

In at least one example embodiment, the discarded plurality of PDCP SDUs are PDCP SDUs that belong to a same PDCP PDU set.

BRIEF DESCRIPTION OF THE DRAWINGS

For a more complete understanding of embodiments of the invention, reference is now made to the following descriptions taken in connection with the accompanying drawings in which.

DETAILED DESCRIPTION OF THE DRAWINGS

Figure 1:
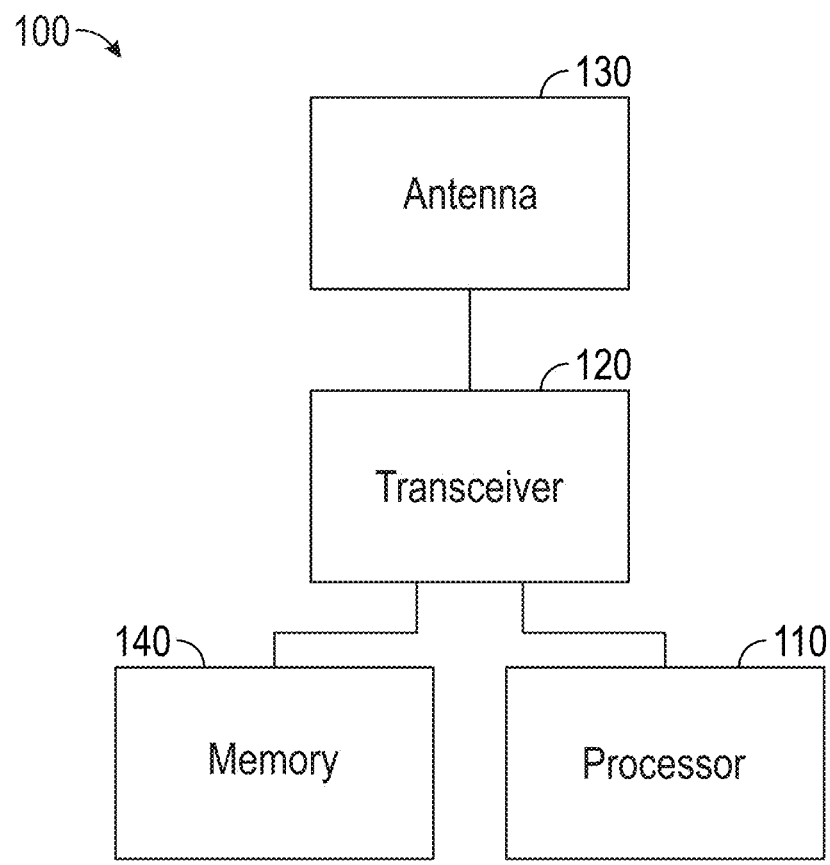
FIG. 1 is a block diagram showing an apparatus according to at least one example embodiment.

An embodiment of the invention and its potential advantages are understood by referring to FIGS. 1 through 6 of the drawings.

Some embodiments will now be described more fully hereinafter with reference to the accompanying drawings, in which some, but not all, embodiments are shown. Various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network apparatus, other network apparatus, and/or other computing apparatus.

As defined herein, a "non-transitory computer-readable medium," which refers to a physical medium (e.g., volatile or non-volatile memory device), can be differentiated from a "transitory computer-readable medium," which refers to an electromagnetic signal.

FIG. 1 is a block diagram showing an apparatus, such as an electronic apparatus 100, according to at least one example embodiment. It should be understood, however, that an electronic apparatus as illustrated and hereinafter described is merely illustrative of an electronic apparatus that could benefit from embodiments of the invention and, therefore, should not be taken to limit the scope of the invention. While electronic apparatus 100 is illustrated and will be hereinafter described for purposes of example, other types of electronic apparatuses may readily employ embodiments of the invention. Electronic apparatus 100 may be a network node, such as a user equipment (UE) or a base station, or may be a personal digital assistant (PDAs), a pager, a mobile computer, a desktop computer, a television, a gaming apparatus, a laptop computer, a tablet computer, a media player, a camera, a video recorder, a mobile phone, a global positioning system (GPS) apparatus, an automobile, a kiosk, an electronic table, and/or any other types of electronic systems. Moreover, the apparatus of at least one example embodiment need not be the entire electronic apparatus but may be a component or group of components of the electronic apparatus in other example embodiments. For example, the apparatus may be an integrated circuit, a set of integrated circuits, and/or the like.

Furthermore, apparatuses may readily employ embodiments of the invention regardless of their intent to provide mobility. In this regard, even though embodiments of the invention may be described in conjunction with mobile applications, it should be understood that embodiments of the invention may be utilized in conjunction with a variety of other applications, both in the mobile communications industries and outside of the mobile communications industries. For example, the apparatus may be, at least part of, a non-carryable apparatus, such as a large screen television, an electronic table, a kiosk, an automobile, and/or the like.

In at least one example embodiment, electronic apparatus 100 comprises processor 110 and memory 140. Processor 110 may be any type of processor, controller, embedded controller, processor core, and/or the like. In at least one example embodiment, processor 110 utilizes computer program code to cause an apparatus to perform one or more actions. Memory 140 may comprise volatile memory, such as volatile Random Access Memory (RAM) including a cache area for the temporary storage of data and/or other memory, for example, non-volatile memory, which may be embedded and/or may be removable. The non-volatile memory may comprise an EEPROM, flash memory and/or the like. Memory 140 may store any of a number of pieces of information, and data. The information and data may be used by electronic apparatus 100 to implement one or more functions of the electronic apparatus 100, such as the functions described herein. In at least one example embodiment, memory 140 includes computer program code such that the memory and the computer program code are configured to, working with the processor, cause the apparatus to perform one or more actions described herein.

The electronic apparatus 100 may further comprise a transceiver 120. In at least one example embodiment, transceiver 120 is coupled with one or more antennae 130. In at least one example embodiment, processor 110 provides and or receives signals to/from transceiver 120. The signals may comprise signaling information in accordance with a communications interface standard, user speech, received data, user generated data, and/or the like. Transceiver 120 may operate with one or more air interface standards, communication protocols, modulation types, and access types. By way of illustration, the electronic transceiver 120 may operate in accordance with second-generation (2G) wireless communication protocols IS-136 (time division multiple access (TDMA)), Global System for Mobile communications (GSM), and IS-95 (code division multiple access (CDMA)), with third-generation (3G) wireless communication protocols, such as Universal Mobile Telecommunications System (UMTS), CDMA2000, wideband CDMA (WCDMA) and time division-synchronous CDMA (TD-SCDMA), and/or with fourth-generation (4G) wireless communication protocols such as LTE, fifth-generation (5G) protocols such as New Radio (NR) wireless networking protocols, such as 802.11, short-range wireless protocols, such as Bluetooth, and/or the like.

Processor 110 may comprise means, such as circuitry, for implementing audio, video, communication, navigation, logic functions, and/or the like, as well as for implementing embodiments of the invention including, for example, one or more of the functions described herein. For example, processor 110 may comprise means, such as a digital signal processor device, a microprocessor device, various analog to digital converters, digital to analog converters, processing circuitry and other support circuits, for performing various functions including, for example, one or more of the functions described herein. The apparatus may perform control and signal processing functions of the electronic apparatus 100 among these devices according to their respective capabilities. The processor 110 thus may comprise the functionality to encode and interleave message and data prior to modulation and transmission. The processor 110 may additionally comprise an internal voice coder, and may comprise an internal data modem. Further, the processor 110 may comprise functionality to operate one or more software programs, which may be stored in memory, and which may, among other things, cause the processor 110 to implement at least a portion of one embodiment including, for example, one or more of the functions described herein. For example, the processor 110 may operate a connectivity program, such as a conventional internet browser. The connectivity program may allow the electronic apparatus 100 to transmit and receive internet content, such as location-based content and/or other web page content, according to a Transmission Control Protocol (TCP), Internet Protocol (IP), User Datagram Protocol (UDP), Internet Message Access Protocol (IMAP), Post Office Protocol (POP), Simple Mail Transfer Protocol (SMTP), Wireless Application Protocol (WAP), Hypertext Transfer Protocol (HTTP), and/or the like, for example.

The electronic apparatus 100 may comprise a user interface for providing output and/or receiving input. The electronic apparatus 100 may comprise an output device, which may comprise an audio output device, such as a ringer, an earphone, a speaker, a tactile output device, such as a vibration transducer, an electronically deformable surface, an electronically deformable structure, a visual output device, such as a display and/or a light. The electronic apparatus 100 may comprise an input device such as a light sensor, a proximity sensor, a microphone, a touch sensor, a force sensor, a button, a keypad, a motion sensor, a magnetic field sensor, a camera, and/or the like. In at least one example embodiment, the apparatus receives an indication of an input. The apparatus may receive the indication from a sensor, a driver, a separate apparatus, and/or the like. The information indicative of the input may comprise information that conveys information indicative of the input, indicative of an aspect of the input indicative of occurrence of the input, and/or the like.

Figure 2:
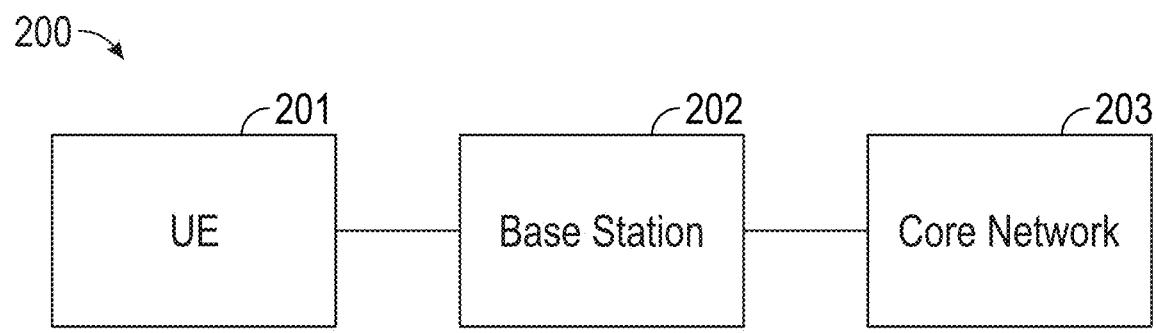
FIG. 2 is a block diagram showing a wireless communications system, according to at least one example embodiment.

FIG. 2 illustrates an example of a wireless communications system 200, according to at least one example embodiment. The wireless communications system 200 includes one or more base stations 202, user equipment (UEs) 201, and a core network 203. The term network node refers to a base station or a UE. In some examples, the wireless communications system 200 may be a Long Term Evolution (LTE), LTE-Advanced (LTE-A) network, or a New Radio (NR) network. In some circumstances, wireless communications system 200 may support enhanced broadband communications, ultra-reliable (i.e., mission critical) communications, low latency communications, and communications with low-cost and low-complexity devices. To improve the reliability of some communications (e.g., ultra-reliable low latency communications (URLLC) packets), the wireless communications system 200 may be configured to generate and transmit duplicate packets. In such duplication systems, a transmitting device (e.g., base station 202 or UE 201) may duplicate a packet. The original packet and duplicated packets may be transmitted to a receiving device (e.g., base station 202 or UE 201). Transmitting multiple packets that include the same information may improve the likelihood that the receiving device receives the information included in the multiple packets.

One or more base stations 202 may wirelessly communicate with one or more UEs 201 via one or more base station antennas. Each base station 202 may provide communication coverage for a respective geographic coverage area. Communication links in wireless communications system 200 may include uplink transmissions from a UE 201 to a base station 202, or downlink transmissions, from a base station 202 to a UE 201. Control information and data may be multiplexed on an uplink channel or downlink according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

A plurality of UEs may be dispersed throughout the wireless communications system 200, and each UE 201 may be stationary or mobile. A UE 201 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 201 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of Things (IoT) device, an Internet of Everything (IoE) device, a machine type communication (MTC) device, an appliance, an automobile, or the like.

In some circumstances, a UE 201 may also be able to communicate directly with other UEs (e.g., using a peer-to-peer (P2P) or device-to-device (D2D) protocol). One or more of a group of UEs utilizing D2D communications may be within the coverage area of a cell. Other UEs in such a group may be outside the coverage area of a cell, or otherwise unable to receive transmissions from base station 202. In some circumstances, groups of UEs communicating via D2D communications may utilize a one-to-many (1:M) system in which each UE transmits to every other UE in the group. In some circumstances, base station 202 facilitates the scheduling of resources for D2D communications. In other circumstances, D2D communications are carried out independent of base station 202.

Some UEs, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

In some circumstances, an MTC device may operate using half-duplex (one-way) communications at a reduced peak rate. MTC devices may also be configured to enter a power saving "deep sleep" mode when not engaging in active communications. In some circumstances, MTC or IoT devices may be designed to support mission critical functions and wireless communication systems may be configured to provide ultra-reliable communications for these functions.

Base station 202 may communicate with the core network 203 and with one or more other base stations. For example, base stations may interface with the core network 203 through come backhaul links (e.g., S1, etc.). Base stations may communicate with one another over other backhaul links (e.g., X2, etc.) either directly or indirectly (e.g., through core network 203). Base stations may perform radio configuration and scheduling for communication with UEs or may operate under the control of a base station controller (not shown). In some examples, base station 202 may be a macro cell, a small cell, a hot spot, and/or the like. Base stations may also be referred to as evolved NodeBs (NBs), such as eNBs, gNBs and/or the like.

Base station 202 may be connected by an S1 interface to core network 203. The core network may be an evolved packet core (EPC), which may include at least one mobility management entity (MME), at least one serving gateway (S-GW), and at least one Packet Data Network (PDN) gateway (P-GW). The MME may be the control node that processes the signaling between UE 201 and the EPC. All user Internet Protocol (IP) packets may be transferred through the S-GW, which itself may be connected to the P-GW. The P-GW may provide IP address allocation as well as other functions. The P-GW may be connected to the network operators IP services. The operator's IP services may include the Internet, the Intranet, an IP Multimedia Subsystem (IMS), and a Packet-Switched (PS) Streaming Service.

The core network 203 may provide user authentication, access authorization, tracking, IP connectivity, and other access, routing, or mobility functions. At least some of the network devices, such as base station 202 may include subcomponents such as an access network entity, which may be an example of an access node controller (ANC). Each access network entity may communicate with a number of UEs through a number of other access network transmission entities, each of which may be an example of a smart radio head, or a transmission/reception point (TRP). In some configurations, various functions of each access network entity or base station may be distributed across various network devices (e.g., radio heads and access network controllers) or consolidated into a single network device (e.g., base station 202).

Wireless communications system 200 may operate in an ultra-high frequency (UHF) frequency region using frequency bands from 700 MHz to 2600 MHz (2.6 GHz), although some networks (e.g., a wireless local area network (WLAN)) may use frequencies as high as 4 GHz. This region may also be known as the decimeter band, since the wavelengths range from approximately one decimeter to one meter in length. UHF waves may propagate mainly by line of sight and may be blocked by buildings and environmental features. However, the waves may penetrate walls sufficiently to provide service to UEs located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. In some circumstances, wireless communications system 200 may also utilize extremely high frequency (EHF) portions of the spectrum (e.g., from 30 GHz to 300 GHz). This region may also be known as the millimeter band, since the wavelengths range from approximately one millimeter to one centimeter in length. Thus, EHF antennas may be even smaller and more closely spaced than UHF antennas. In some circumstances, this may facilitate the use of antenna arrays within UE 201 (e.g., for directional beamforming). However, EHF transmissions may be subject to even greater atmospheric attenuation and shorter range than UHF transmissions.

Thus, wireless communications system 200 may support millimeter wave (mmW) communications between UEs and base stations. Devices operating in mmW or EHF bands may have multiple antennas to allow beamforming. That is, base station 202 may use multiple antennas or antenna arrays to conduct beamforming operations for directional communications with UE 201. Beamforming (which may also be referred to as spatial filtering or directional transmission) is a signal processing technique that may be used at a transmitter (e.g., a base station) to shape and/or steer an overall antenna beam in the direction of a target receiver (e.g., a UE). This may be achieved by combining elements in an antenna array in such a way that transmitted signals at particular angles experience constructive interference while others experience destructive interference.

Multiple-input multiple-output (MIMO) wireless systems use a transmission scheme between a transmitter (e.g., a base station) and a receiver (e.g., a UE), where both transmitter and receiver are equipped with multiple antennas. Some portions of wireless communications system 200 may use beamforming. For example, base station 202 may have an antenna array with a number of rows and columns of antenna ports that the base station may use for beamforming in its communication with UE 201. Signals may be transmitted multiple times in different directions (e.g., each transmission may be beamformed differently). A mmW receiver (e.g., a UE) may try multiple beams (e.g., antenna subarrays) while receiving the synchronization signals.

In some circumstances, the antennas of base station 202 or UE 201 may be located within one or more antenna arrays, which may support beamforming or MIMO operation. One or more base station antennas or antenna arrays may be collocated at an antenna assembly, such as an antenna tower. In some circumstances, antennas or antenna arrays associated with base station 202 may be located in diverse geographic locations. Base station 202 may use multiple antennas or antenna arrays to conduct beamforming operations for directional communications with UE 201.

In some circumstances, wireless communications system 200 may be a packet-based network that operates according to a layered protocol stack. In the user plane, communications at the bearer or PDCP layer may be IP-based. An RLC layer may in some circumstances perform packet segmentation and reassembly to communicate over logical channels. A Medium Access Control (MAC) layer may perform priority handling and multiplexing of logical channels into transport channels. The MAC layer may also use Hybrid Automatic Repeat Request (HARQ) to provide retransmission at the MAC layer to improve link efficiency. In the control plane, the Radio Resource Control (RRC) protocol layer may provide establishment, configuration, and maintenance of an RRC connection between UE 201 and a network device or core network 203 supporting radio bearers for user plane data. At the Physical (PHY) layer, transport channels may be mapped to physical channels.

Time intervals in LTE or NR may be expressed in multiples of a basic time unit (which may be a sampling period of $T_s=1/30{,}720{,}000$ seconds). Time resources may be organized according to radio frames of length of 10 ms ($T_f=307200\ T_s$), which may be identified by a system frame number (SFN) ranging from 0 to 1023. Each frame may include ten one ms subframes numbered from zero to nine. A subframe may be further divided into two 0.5 ms slots, each of which contains six or seven modulation symbol periods (depending on the length of the cyclic prefix prepended to each symbol). Excluding the cyclic prefix, each symbol contains 2048 sample periods. In some circumstances, the subframe may be the smallest scheduling unit, also known as a TTI. In other circumstances, a TTI may be shorter than a subframe or may be dynamically selected (e.g., in short TTI bursts or in selected component carriers using short TTIs).

A resource element may consist of one symbol period and one subcarrier (e.g., a 15 KHz frequency range). A resource block may contain twelve consecutive subcarriers in the frequency domain and, for a normal cyclic prefix in each orthogonal frequency-division multiplexing (OFDM) symbol, seven consecutive OFDM symbols in the time domain (one slot), or 84 resource elements. The number of bits carried by each resource element may depend on the modulation scheme (the configuration of symbols that may be selected during each symbol period). Thus, the more resource blocks that a UE receives and the higher the modulation scheme, the higher the data rate may be.

Wireless communications system 200 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. UE 201 may be configured with multiple downlink CCs and one or more uplink CCs for carrier aggregation. Carrier aggregation may be used with both frequency division duplexing (FDD) and time division duplexing (TDD) component carriers.

In some circumstances, wireless communications system 200 may utilize both licensed and unlicensed radio frequency spectrum bands. For example, wireless communications system 200 may employ LTE License Assisted Access (LTE-LAA) or LTE Unlicensed (LTE U) radio access technology or NR technology in an unlicensed band such as the 5 GHz Industrial, Scientific, and Medical (ISM) band. When operating in unlicensed radio frequency spectrum bands, wireless devices such as base station 202 and UE 201 may employ listen-before-talk (LBT) procedures to ensure the channel is clear before transmitting data. In some circumstances, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Figure 3:
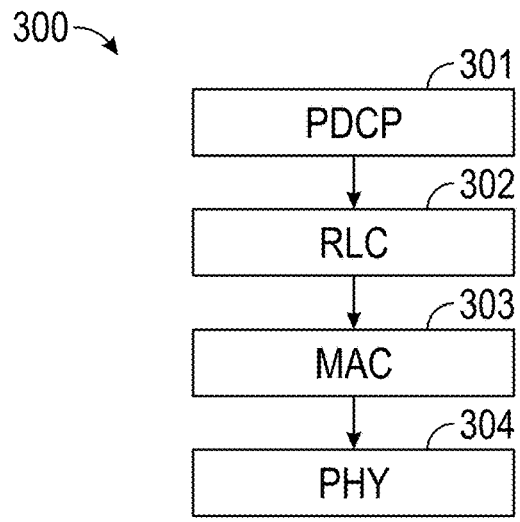
FIG. 3 is a diagram illustrating a protocol stack according to at least one example embodiment.

FIG. 3 is a diagram illustrating a protocol stack 300 according to at least one example embodiment. The example of FIG. 3 is merely an example and does not necessarily limit the scope of the claims.

In at least one example embodiment, physical (PHY) layer 304 provides an information transfer service to a higher layer using a physical channel. The PHY layer 304 may be connected to a medium access control (MAC) layer 303 located on the higher layer via a transport channel. Data may be transported between the MAC layer 303 and the PHY layer 304 via the transport channel. Data may be transported between a physical layer of a transmitting side and a physical layer of a receiving side via physical channels. The physical channels use time and frequency as radio resources. In some circumstances, the physical channel is modulated using an orthogonal frequency division multiple access (OFDMA) scheme in downlink and is modulated using a single carrier frequency division multiple access (SC-FDMA) scheme in uplink.

In at least one example embodiment, MAC layer 303 provides a service to a radio link control (RLC) layer 302 of a higher layer via a logical channel. The RLC layer 302 of the second layer supports reliable data transmission. A function of the RLC layer 302 may be implemented by a functional block of the MAC layer 303. A packet data convergence protocol (PDCP) layer 301 performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

In at least one example embodiment, the PDCP layer is implemented by way of a PDCP entity that performs various actions of the PDCP layer. In this manner, an operating network node comprises one or more PDCP entities for performing PDCP layer activities. In operation, the PDCP entity receives data for transmission from higher layers in a PDCP service data unit (SDU). The PDCP entity performs various operations on the PDCP SDUs that it receives from higher layers for transmission, such as header compression, uplink data compression, integrity protection, ciphering, and/or the like. The PDCP performs these operations on a received PDCP SDU to generate a PDCP packet data unit (PDU) that is transmitted by way of the PDCP entity sending the PDCP SDU to lower layers for transmission.

A transmitting PDCP entity may track successful delivery of PDCP SDUs to the receiving PDCP entity. For example, the transmitting PDCP entity may receive a PDCP status report from the receiving PDCP entity that indicates which PDCP SDUs have been received, and which PDCP SDUs have not been received, which allows the transmitting PDCP entity to take action regarding the received and non-received PDCP SDUs.

In at least one example embodiment, the PDCP entity has a plurality of SDUs that have been received from higher layers for transmission. For example, the PDCP entity may use a buffer to store a plurality of PDCP SDUs for transmission.

In some circumstances, it may be desirable to discard one or more PDCP SDUs to that the network node (such as the UE or base station) does not transmit the SDU. For example, there may be a timer that tracks the amount of time after a PDCP SDU is received from upper layers to determine whether to discard a PDCP SDU, which may be referred to as a discard timer. In such an example, the discard timer may be started or restarted when the PDCP entity receives a PDCP SDU for transmission from higher layers. In such an example, it may be desirable to discard a PDCP SDU upon expiration of the discard timer. In this manner, when circumstances prevent transmission of a PDCP SDU from the plurality of PDCP SDUs for transmission before the expiration of the discard timer, the PDCP entity can discard one or more PDCP SDUs from the plurality of PDCP SDUs for transmission in order to reduce the number of buffered PDCP SDUs for transmission.

In some circumstances, it may be desirable to limit the discarding of PDCP SDUs to low importance SDUs. For example, there may be a timer that tracks the amount of time after a low importance PDCP SDU is received from upper layers to determine whether to discard a low importance PDCP SDU, which may be referred to as a low importance discard timer. In such an example, the low importance discard timer may be started or restarted when the PDCP entity receives a low importance PDCP SDU for transmission from higher layers. In such an example, it may be desirable to discard a low importance PDCP SDU upon expiration of the discard timer. In this manner, when circumstances prevent transmission of a low importance PDCP SDU from the plurality of PDCP SDUs for transmission before the expiration of the low importance discard timer, the PDCP entity can discard one or more low importance PDCP SDUs from the plurality of PDCP SDUs for transmission in order to reduce the number of buffered low importance PDCP SDUs for transmission, which may have the effect of providing improved opportunity for transmitting PDCP SDUs of higher importance than the low importance PDCP SDU.

Figure 4:
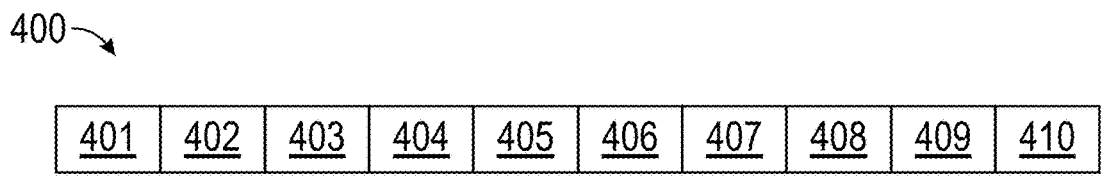
FIG. 4 is a diagram illustrating a group of PDCP PDUs according to at least one example embodiment.

FIG. 4 is a diagram illustrating a group of PDCP PDUs 400 according to at least one example embodiment. The example of FIG. 4 is merely an example and does not necessarily limit the scope of the claims. In at least one example embodiment the PDCP entity receives PDCP SDUs 401-410 for transmission.

In some circumstances, there may be a plurality of PDCP PDUs that are cohesively related to each other. In such circumstances, these PDCP PDUs may belong to a PDCP PDU set. In such circumstances, the PDCP SDUs that correspond with the PDCP PDUs in the PDCP PDU set also belong to the PDCP PDU set. For example, PDCP SDUs 401-410 and the corresponding PDCP PDUs may belong to a single PDCP PDU set. In another example, PDCP SDUs 401-403, 406, 408, and 410 and the corresponding PDCP PDU belong to a first PDCP SDU set, while PDCP SDUs 404, 405, 407, and 409 and the corresponding PDCP PDU belong to a second PDCP SDU set.

In some circumstances, it may be desirable to discard all PDCP SDUs in a PDCP SDU set when any PDCP SDU from the PDCP SDU set is discarded. For example, in some circumstances, the receiving PDCP entity may not benefit from receiving only a subset of the PDCP SDUs in the PDCP SDU set. In such an example, discarding the remaining PDCP SDUs in the PDCP SDU set in circumstances where one or more of the PDCP SDUs are discarded from the PDCP SDU set improves efficiency by avoiding transmission of PDCP SDUs that are not needed by the receiving PDCP entity. In at least one example embodiment, in circumstances where the PDCP entity discards a PDCP SDU in a PDCP SDU set, the PDCP entity discards remaining PDCP SDUs in the PDCP SDU set from the PDCP SDUs for transmission. In some circumstances, it may be desirable to discard only untransmitted PDCP SDUs from the plurality of PDCP SDUs for transmission and retain transmitted PDCP SDUs in the plurality of PDCP SDUs for transmission. For example, in circumstances where a first group of PDCP SDUs from a PDCP SDU set have been transmitted prior to the discarding of a PDCP SDU, it may be desirable to discard the remaining untransmitted PDCP SDUs in the PDCP SDU set from the plurality of PDCP SDUs for transmission, and to retain, in the PDCP SDUs for transmission, the first group of PDCP SDUs. In this manner, by retaining the first group of PDCP SDUs, which have been transmitted, the PDCP entity can still handle a PDCP status report that includes PDCP status information pertaining to a PDCP SDU in the first group of PDCP SDUs.

In some circumstances, the discarding of one or more PDCP SDUs may cause inefficiencies in the receiving PDCP entity. For example, the receiving PDCP entity may continue to wait for receipt of the discarded PDCP SDUs. It may be desirable to improve the efficiency of the receiving PDCP entity by way of the transmitting PDCP entity notifying the receiving PDCP entity of the discarded PDCP SDUs so that the receiving PDCP entity knows of the discarded PDCP SDUs. In at least one example embodiment, the PDCP entity transmits a discard notification. In at least one example embodiment, a discard notification is a notification that indicates that the PDCP entity has discarded one or more PDCP SDUs. In at least one example embodiment, the discard notification includes information indicating one or more discarded SDUs. In at least one example embodiment, the discard notification is a PDCP control PDU. For example, the discard notification may be a PDCP SDU discard report control PDU, a PDCP SN gap report control PDU, and/or the like.

In at least one example embodiment, the PDCP entity generates the discard notification based on the discarding of the at least one PDCP SDU. For example, the discard notification may be generated based on the SN associated with the discarded PDCP SDU. In such an example, the discard notification may be generated based on the SN of the discarded PDCP SDU such that the SN is indicated by the discard notification.

There are various manners in which the discard notification may provide information indicating a discarded PDCP SDU. For example, the discard notification may indicate the discarded PDCP SUD by way of a count or an SDN associated with the PDCP SDU. As previously discussed, in some circumstances, there may be a plurality of discarded PDCP SDUs. In some circumstances, the plurality of discarded PDCP SDUs may be contiguous. For example, circumstances may exist where PDCP SDUs 402-407 are discarded from the plurality of PDCP SDUs 400. In such circumstances, the plurality of discarded PDCP SDUs is contiguous. In other circumstances, the plurality of discarded PDCP SDUs may be non-contiguous. For example, circumstances may exist where PDCP SDUs 401, 404, and 408 are discarded from the plurality of PDCP SDUs 400. In such circumstances, the plurality of discarded PDCP SDUs is non-contiguous.

In circumstances where there is a plurality of discarded PDCP SDUs, the discard notification may comprise a bitmap indication and/or a range indication that indicates the plurality of discarded PDCP SDUs. In at least one example embodiment, the UE receives configuration information indicating enablement the discard notification, the bitmap indication, and/or the range indication. The configuration information may be received by way of one or more RRC messages, such as an RRCReconfiguration message. For example, the configuration may be included in an information element that is included by the RRC message. In some circumstances, the configuration information may be included in the information element when the corresponding discard notification, bitmap indication, and/or range indication is enabled. For example, the configuration information may indicate disablement of the corresponding discard notification, bitmap indication, and/or range indication by way of its absence from the information element. In at least one example embodiment, configuration information indicates that a discard notification is enabled. In at least one example embodiment, configuration information indicates that a discard notification comprising a bitmap indication is enabled. In at least one example embodiment, the configuration information indicates that a discard notification comprising a range indication is enabled.

In at least one example embodiment, the PDCP entity determines whether or not to generate a discard notification based on the configuration information. In at least one example embodiment, the PDCP entity determines whether or not to include a bitmap indication in the discard notification based on the configuration information. In at least one example embodiment, the PDCP entity determines whether or not to include a range indication in the discard notification based on the configuration information.

In at least one example embodiment, the discard notification indicates the discarding of the PDCP SDU by way of the bitmap indication and a first discarded PDCP SDU indication. In at least one example embodiment, the first discarded PDCP SDU indication identifies a PDCP SDU that begins a plurality of discarded PDCP SDUs. In at least one example embodiment, the first discarded PDCP SDU indication is a count. In at least one example embodiment, the first discarded PDCP SDU indication is a sequence number (SN).

In at least one example embodiment, the bitmap indication is a set of bits where each bit position of the bitmap indication corresponds with a PDCP SDU that follows the first discarded PDCP SDU. In at least one example embodiment, each bit position of the bitmap indication corresponds with a PDCP SDU that follows the first discarded PDCP SDU. In at least one example embodiment, a first bit in the bitmap corresponds with a PDCP SDU immediately subsequent to a PDCP SDU corresponding to the first discarded PDCP SDU indication. In at least one example embodiment, an $n^{th}$ bit in the bitmap corresponds with a PDCP SDU that is n PDCP SDUs after a PDCP SDU corresponding to the first discarded PDCP SDU indication. For example, $n^{th}$ bit in the bitmap may correspond with a PDCP SDU having a count or SN of the first discarded PDCP SDU count or SN+n. In at least one example embodiment, each bit value in the bitmap indication indicates whether or not the corresponding PDCP SDU was discarded. For example, a bit value of 1 may indicate that the corresponding PDCP SDU was discarded such that a bit value of 0 indicates that the corresponding PDCP SDU was not discarded. In another example, a bit value of 0 may indicate that the corresponding PDCP SDU was discarded such that a bit value of 1 indicates that the corresponding PDCP SDU was not discarded. In at least one example embodiment, each bit value in the bitmap indicates whether the corresponding PDCP SDU was either discarded or transmitted (for example, sent to lower layers by the PDCP entity for transmission). For example, a bit value of 1 may indicate that the corresponding PDCP SDU was discarded such that a bit value of 0 indicates that the corresponding PDCP SDU was transmitted. In another example, a bit value of 0 may indicate that the corresponding PDCP SDU was discarded such that a bit value of 1 indicates that the corresponding PDCP SDU was transmitted.

In at least one example embodiment, the PDPC entity generates the bitmap indication. In at least one example embodiment, generating the bitmap indication comprises determining a size of the bitmap indication. In some circumstances, it may be desirable for the bitmap indication to be an integer number of bytes. In at least one example embodiment, the size of the bitmap indication is an integer multiple of 8. In at least one example embodiment, the size of the bitmap indication is determined such that the bitmap includes a bit corresponding to a last discarded PDCP SDU and less than 8 subsequent additional bits that bring the size of the bitmap indication to an integer multiple of 8.

In at least one example embodiment, the discard notification indicates the discarding of the PDCP SDU by way of one or more bitmap indication and a plurality of discarded PDCP SDU indications. For example, the discard notification may include a plurality of bitmap indication and first discarded PDCP SDU indication pairs. However, in some circumstances there may be a discarded PDCP SDU that is not sufficiently proximate to another discarded PDCP SDU in order to warrant the overhead associated with a bitmap. In such circumstances, it may be desirable to indicate the discarded PDCP SDU by way of a first discarded PDCP SDU indicator without any corresponding bitmap indicator.

In at least one example embodiment, the discard notification indicates the discarding of the PDCP SDU by way of a range indication. In at least one example embodiment, the range indication indicates a contiguous set of discarded PDCP SDUs. In at least one example embodiment, the range indication includes a first discarded PDCP SDU indication. The first discarded PDCP SDU indication may be a count, an SN, and/or the like. In at least one example embodiment, the range indication includes the first discarded PDCP SDU indication and a last discarded PDCP SDU indication. In at least one example embodiment, the last discarded PDCP SDU indication indicates the last PDCP SDU included in the range indication. It should be noted that the term last PDCP SDU does not necessarily refer to an absolute final discarded PDCP SDU, but instead refers to the last PDCP SDU that is included in the range indication. Specifically, there may be another discarded PDCP SDUs at a later count or SN that is not included in the scope of the range indication. For example, the other discarded SDU may be included in a different range indication, a bitmap indication, and/or the like. In at least one example embodiment, the last discarded PDCP SDU indication directly indicates the last PDCP SDU of the range indication. For example, the last discarded PDCP SDU indication may be a count, an SN and/or the like, which identifies the last discarded PDCP SDU. In at least one example embodiment, the last discarded PDCP SDU indication indirectly indicates the PDCP SDU. For example, the last discarded PDCP SDU indication may indicate the PDCP SDU by an offset from the first discarded PDCP SDU. In at least one example embodiment, the PDCP entity generates the range notification.

In at least one example embodiment, the discard notification indicates the discarding of a plurality of PDCP SDUs by way of a combination of one or more range indication with one or more bitmap indication and one or more corresponding first discarded PDCP SDU indication. For example, the discard notification may indicate the discarding of a first plurality of PDCP SDUs by way of one or more range indications and may indicate the discarding of a second plurality of PDCP SDUs by way of one or more bitmap indication and one or more corresponding first discarded PDCP SDU indication. In some circumstances, there may be a few non-contiguous discarded PDCP SDUs immediately followed by contiguous discarded PDCP SDUs. In such circumstances, the discard notification may include a first discarded PDCP SDU indication and corresponding bitmap indication for the non-contiguous discarded PDCP SDUs and include a range indication for the contiguous discarded PDCP SDUs. In at least one example embodiment, the size of the bitmap indication is determined such that the last bit of the bitmap corresponds with a discarded PDCP SDU immediately prior to a PDCP SDU that is included in a range indication.

Figure 5:
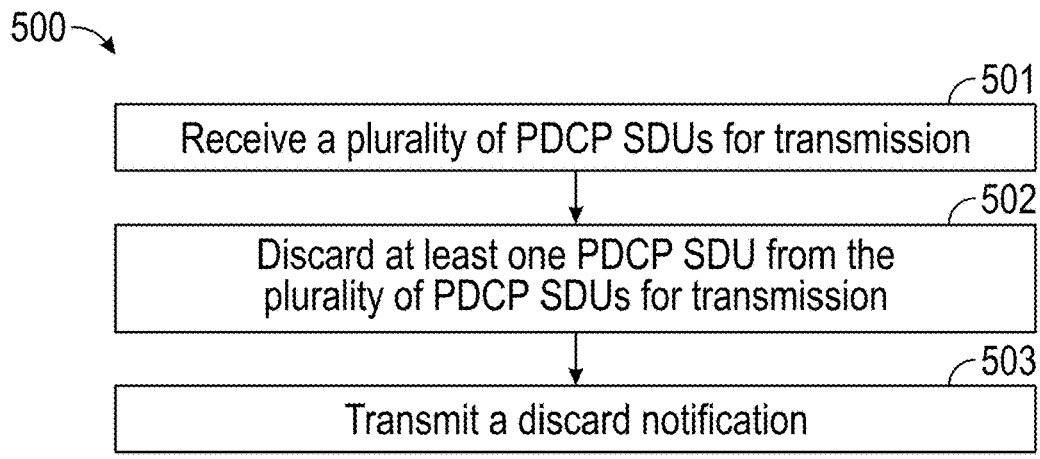
FIG. 5 is a flow diagram illustrating activities associated with sending a discard notification according to at least one example embodiment.

FIG. 5 is a flow diagram illustrating activities 500 associated with sending a discard notification according to at least one example embodiment. In at least one example embodiment, there is a set of operations that corresponds with the activities of FIG. 5. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 5.

At block 501, the apparatus receives a plurality of PDCP SDUs for transmission. For example, the plurality of PDCP SDUs may be received by a PDCP entity of the apparatus and may be received from higher layers, such as a layer above the PDCP layer.

At block 502, the apparatus discards at least one PDCP SDU from the plurality of PDCP SDUs for transmission. The discarding may be similar to the discarding described regarding FIGS. 3 and 4.

At block 503, the apparatus transmits a discard notification. As previously discussed, the discard notification may indicate the discarding of the PDCP SDU, similarly to the discussion regarding FIG. 4. For example, the content of the discard notification may be based on the discarding of the at least one PDCP SDU.

Figure 6:
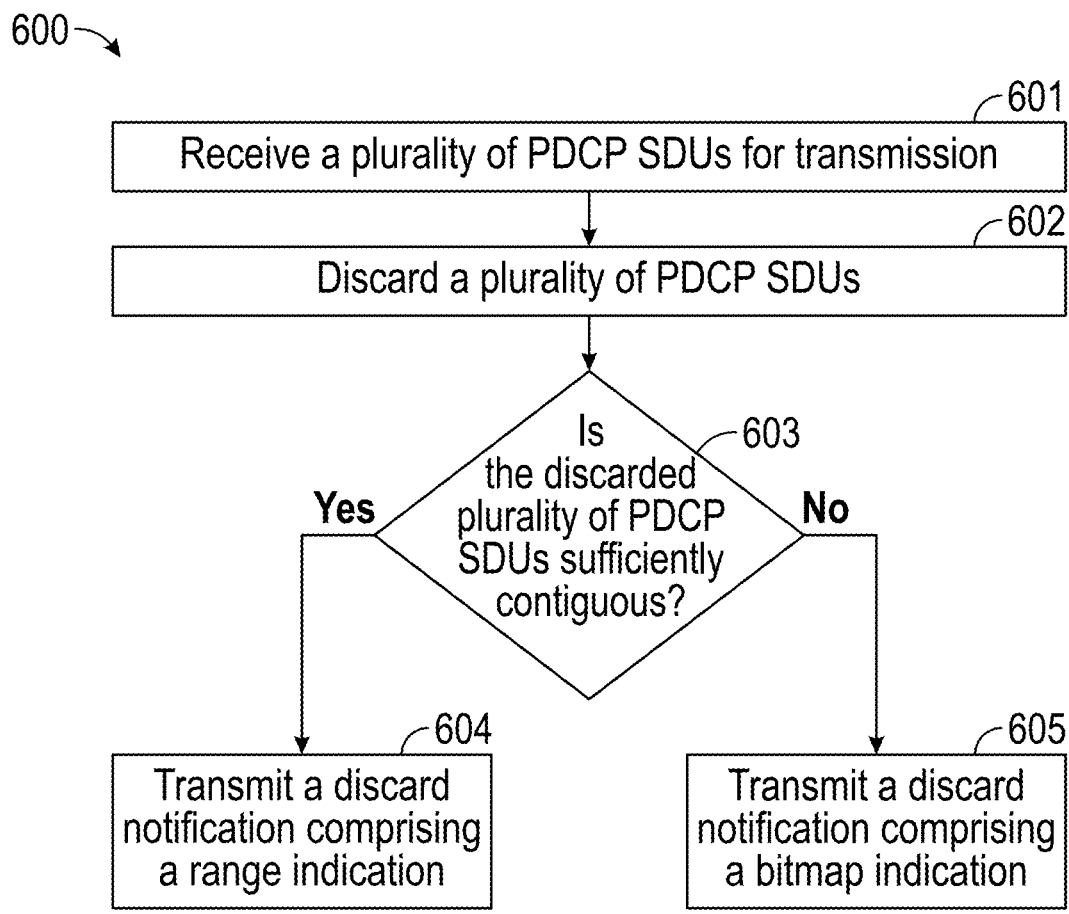
FIG. 6 is a flow diagram illustrating activities associated with sending a discard notification according to at least one example embodiment.

FIG. 6 is a flow diagram illustrating activities 600 associated with sending a discard notification according to at least one example embodiment. In at least one example embodiment, there is a set of operations that corresponds with the activities of FIG. 6. An apparatus, for example electronic apparatus 100 of FIG. 1, or a portion thereof, may utilize the set of operations. The apparatus may comprise means, including, for example processor 110 of FIG. 1, for performance of such operations. In an example embodiment, an apparatus, for example electronic apparatus 100 of FIG. 1, is transformed by having memory, for example memory 140 of FIG. 1, comprising computer code configured to, working with a processor, for example processor 110 of FIG. 1, cause the apparatus to perform the set of operations of FIG. 6.

As previously discussed, the discard notification may include a bitmap indication or a range indication. However, there are circumstances in which the bitmap indication is more efficient than the range indication and there are other circumstances where the range indication is more efficient than the bitmap indication. For example, if there is a large contiguous set of discarded PDCP SDUs, the range indication may be more efficient than the bitmap indication. However, the number of contiguous discarded PDCP SDUs is low, the bitmap indication may be more efficient than the range indication. In at least one example embodiment, the apparatus determines to use the range notification to indicate a contiguous set of discarded PDCP SDUs, instead of the combination of the bitmap indication and the first discarded PDCP SDU, when the combination of the bitmap indication and the first discarded PDCP SDU would be larger than the corresponding range indication. In at least one example embodiment, a contiguous set of discarded PDCP SDUs is considered to be sufficiently contiguous when the combination of the bitmap indication and the first discarded PDCP SDU would be larger than the corresponding range indication. In at least one example embodiment, the apparatus determines to use the combination of the bitmap indication and the first discarded PDCP SDU to indicate a contiguous set of discarded PDCP SDUs, instead of the range notification, when the combination of the range indication would be larger than the corresponding bitmap indication and the first discarded PDCP SDU. In at least one example embodiment, a contiguous set of discarded PDCP SDUs is considered to be sufficiently non-contiguous when the combination of the range indication would be larger than the corresponding bitmap indication and the first discarded PDCP SDU.

In at least one example embodiment, the apparatus determines whether to include a bitmap indication or a range indication based on a determination of whether the discarded PDCP SDUs is sufficiently contiguous. In at least one example embodiment, determining whether the discarded PDCP SDUs is sufficiently contiguous comprises determining whether a number of contiguous PDCP SDUs exceeds a range threshold. For example, the apparatus may determine that the discarded PDCP SDUs is sufficiently non-contiguous, for the purposes of the discard notification, when the number of contiguous PDCP SDUs is less than a range threshold (and in some implementations also include circumstances where the number of contiguous PDCP SDUs is equal to a range threshold) and may determine that the discarded PDCP SDUs is sufficiently contiguous, for the purposes of the discard notification, when the number of contiguous PDCP SDUs is greater than a range threshold (and in some implementations also include circumstances where the number of contiguous PDCP SDUs is equal to a range threshold). The range threshold may be a number that corresponds with the number of contiguous discarded SDUs that are necessary for the range indication to be fewer bits (or fewer octets) than the combination of the bitmap indication and the corresponding first discarded PDCP SDU indication.

At block 601, the apparatus receives a plurality of PDCP SDUs for transmission, similarly as described regarding block 501 of FIG. 5.

At block 602, the apparatus discards at least one PDCP SDU from the plurality of PDCP SDUs for transmission, similarly as described regarding block 502 of FIG. 5.

At block 603, the apparatus determines whether or not the discarded plurality of PDCP SDUs is sufficiently contiguous. If the discarded plurality of PDCP SDUs is sufficiently contiguous, flow proceeds to block 604. If the discarded plurality of PDCP SDUs is sufficiently non-contiguous, flow proceeds to block 605. As previously discussed, the determination of whether a discarded plurality of PDCP SDUs is sufficiently contiguous comprises determining whether a number of contiguous PDCP SDUs in the discarded plurality of PDCP SDUs exceeds a range threshold. Consequently, in at least one example embodiment, at block 603, the apparatus determines whether a number of contiguous PDCP SDUs of the discarded plurality of PDCP SDUs exceeds a range threshold. In such an embodiment, if the number of contiguous PDCP SDUs of the discarded plurality of PDCP SDUs exceeds the range threshold, flow proceeds to block 604, and if the number of contiguous PDCP SDUs of the discarded plurality of PDCP SDUs does not exceed the range threshold, flow proceeds to block 605.

At block 604, the apparatus includes the range indication in the discard notification to indicate the discarding of the plurality of PDCP SDUs.

At block 605, the apparatus includes a bitmap indication and a corresponding first discarded PDCP SDU indication in the discard notification to indicate the discarding of the plurality of PDCP SDUs.

Embodiments of the invention may be implemented in software, hardware, application logic or a combination of software, hardware, and application logic. The software, application logic and/or hardware may reside on the apparatus, a separate device, or a plurality of separate devices. If desired, part of the software, application logic and/or hardware may reside on the apparatus, part of the software, application logic and/or hardware may reside on a separate device, and part of the software, application logic and/or hardware may reside on a plurality of separate devices. In an example embodiment, the application logic, software or an instruction set is maintained on any one of various conventional computer-readable media.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are variations and modifications which may be made without departing from the scope of the present invention as defined in the appended claims.

What is claimed is:

1. An apparatus, comprising:
at least one processor; and
at least one memory including computer program code, the memory and the computer program code configured to, working with the processor, cause the apparatus to perform at least the following:

receive, by a Packet Data Convergence Protocol (PDCP) entity of the apparatus, a plurality of PDCP Service Data Units (SDUs) for transmission;

discard at least one PDCP SDU from the plurality of PDCP SDUs for transmission; and transmit a discard notification, the discard notification indicating the discarding of the at least one PDCP SDU by way of a bitmap indication and a first discarded PDCP SDU indication.

2. The apparatus of claim 1, wherein the memory includes computer program code configured to, working with the processor, cause the apparatus to receive configuration information indicating that a discard notification is enabled.

3. The apparatus of claim 1, wherein the memory includes computer program code configured to, working with the processor, cause the apparatus to generate the discard notification based on the discarding of the at least one PDCP SDU.

4. The apparatus of claim 1, wherein each bit position of the bitmap indication corresponds with a PDCP SDU that follows a PDCP SDU indicated by the first discarded PDCP SDU indication and each bit value in the bitmap indication indicates whether or not the corresponding PDCP SDU was discarded.

5. The apparatus of claim 1, wherein the discard notification further indicates the discarding of the at least one PDCP SDU by way of a range indication that comprises a first discarded PDCP SDU indication and a last discarded PDCP SDU indication.

6. The apparatus of claim 1, wherein discarding at least one PDCP SDU comprises discarding a plurality of PDCP SDUs and the memory includes computer program code configured to, working with the processor, cause the apparatus to include a range indication in the discard notification based on a determination that a number of contiguous discarded PDCP SDUs exceeds a range threshold.

7. The apparatus of claim 1, wherein discarding at least one PDCP SDU comprises discarding a plurality of PDCP SDUs and the memory includes computer program code configured to, working with the processor, cause the apparatus to include the bitmap indication in the discard notification based on a determination that a number of contiguous discarded PDCP SDUs does not exceed a range threshold.

8. The apparatus of claim 1, wherein discarding at least one PDCP SDU comprises discarding a plurality of PDCP SDUs that belong to a same PDCP PDU set.

9. The apparatus of claim 1, wherein a first bit in the bitmap indication corresponds with a PDCP SDU immediately subsequent to the PDCP SDU indicated by the first discarded PDCP SDU indication.

10. A method, comprising:

receiving, by a Packet Data Convergence Protocol (PDCP) entity, a plurality of PDCP Service Data Units (SDUs) for transmission;

discarding at least one PDCP SDU from the plurality of PDCP SDUs for transmission; and transmitting a discard notification, the discard notification indicating the discarding of the at least one PDCP SDU by way of a bitmap indication and a first discarded PDCP SDU indication.

11. The method of claim 10, further comprising receiving configuration information indicating that a discard notification is enabled.

12. The method of claim 10, further comprising generating the discard notification based on the discarding of the at least one PDCP SDU.

13. The method of claim 10, wherein each bit position of the bitmap indication corresponds with a PDCP SDU that follows a PDCP SDU indicated by the first discarded PDCP SDU indication and each bit value in the bitmap indication indicates whether or not the corresponding PDCP SDU was discarded.

14. The method of claim 10, wherein the discard notification further indicates the discarding of the at least one PDCP SDU by way of a range indication that comprises a first discarded PDCP SDU indication and a last discarded PDCP SDU indication.

15. The method of claim 10, wherein discarding at least one PDCP SDU comprises discarding a plurality of PDCP SDUs and further comprising including a range indication in the discard notification based on a determination that a number of contiguous discarded PDCP SDUs exceeds a range threshold.

16. The method of claim 10, wherein discarding at least one PDCP SDU comprises discarding a plurality of PDCP SDUs and further comprising including the bitmap indication in the discard notification based on a determination that a number of contiguous discarded PDCP SDUs does not exceed a range threshold.

17. The method of claim 10, wherein discarding at least one PDCP SDU comprises discarding a plurality of PDCP SDUs that belong to a same PDCP PDU set.

18. The method of claim 10, wherein a first bit in the bitmap indication corresponds with a PDCP SDU immediately subsequent to the PDCP SDU indicated by the first discarded PDCP SDU indication.

19. At least one non-transitory computer-readable medium encoded with instructions that, when executed by a processor, perform:

receiving, by a Packet Data Convergence Protocol (PDCP) entity, a plurality of PDCP Service Data Units (SDUs) for transmission;

discarding at least one PDCP SDU from the plurality of PDCP SDUs for transmission; and transmitting a discard notification, the discard notification indicating the discarding of the at least one PDCP SDU by way of a bitmap indication and a first discarded PDCP SDU indication.

* * * * *